(12) United States Patent
Yamaguchi

(10) Patent No.: US 11,545,348 B2
(45) Date of Patent: Jan. 3, 2023

(54) IMAGING MASS SPECTROMETER AND METHOD FOR IMAGING MASS SPECTROMETRY

(71) Applicant: SHIMADZU CORPORATION, Kyoto (JP)

(72) Inventor: Shinichi Yamaguchi, Kyoto (JP)

(73) Assignee: SHIMADZU CORPORATION, Kyoto (JP)

( * ) Notice: Subject to any disclaimer, the term of this patent is extended or adjusted under 35 U.S.C. 154(b) by 155 days.

(21) Appl. No.: 17/174,439

(22) Filed: Feb. 12, 2021

(65) Prior Publication Data

US 2021/0391160 A1    Dec. 16, 2021

(30) Foreign Application Priority Data

Jun. 15, 2020 (JP) .............................. JP2020-102830

(51) Int. Cl.
*H01J 49/00* (2006.01)
*G06T 7/11* (2017.01)

(52) U.S. Cl.
CPC ............ *H01J 49/0004* (2013.01); *G06T 7/11* (2017.01); *H01J 49/0036* (2013.01); *G06T 2207/10024* (2013.01)

(58) Field of Classification Search
CPC ..... H01J 49/0004; H01J 49/0036; G06T 7/11; G06T 2207/10024; G06T 2207/10056;
(Continued)

(56) References Cited

U.S. PATENT DOCUMENTS

2013/0080072 A1   3/2013 Ikegami
2014/0324362 A1*  10/2014 Andersson .......... H01J 49/0036
                                              702/28

FOREIGN PATENT DOCUMENTS

JP    2013-68565 A    4/2013
WO    2015/053039 A1  4/2015

OTHER PUBLICATIONS

Shimadzu Excellent in Science, "Mass Spectrometry Imaging Data Analysis Software IMAGEREVEAL MS Ver.1.1", a product catalogue by Shimadzu Corporation, first edition published in Jan. 2020.

(Continued)

*Primary Examiner* — Michael Maskell
(74) *Attorney, Agent, or Firm* — Sughrue Mion, PLLC

(57) ABSTRACT

A measurement section (1) performs a mass spectrometric analysis for each micro area within a measurement area on a sample. A dimension reduction processor (23) performs data processing by non-linear dimension reduction using manifold learning on mass spectrometric data for each micro area, to obtain, for each micro area, a set of data reduced to three dimensions from the dimensions corresponding to the number of mass-to-charge-ratio values. A display color determiner (24) determines a color for each of the points corresponding to the data of the micro areas after the dimension reduction, by arranging those points within a three-dimensional space having three axes representing the three dimensions, with three primary colors respectively assigned to the three axes. A segmentation image creator (25) creates a segmentation image corresponding to the measurement area or a partial area in the measurement area, by arranging, on two dimensions, pixels which respectively correspond to the points within the three-dimensional space, where each pixel has a color given to the point corresponding to the pixel and is located according to the position within the measurement area of the micro area corresponding to the point.

10 Claims, 7 Drawing Sheets

(58) Field of Classification Search
CPC . G06T 2207/30024; G06T 7/168; G06T 7/90;
G06K 9/6248
USPC .................................................. 250/281, 282
See application file for complete search history.

(56) References Cited

OTHER PUBLICATIONS

Leland McInnes et al., "UMAP:Uniform Manifold Approximation and Projection for Dimension Reduction", Jun. 1, 2020, arXiv, the Internet<URL: https://arxiv.org/pdf/1802.03426.pdf>.

* cited by examiner

DATA MATRIX AFTER DIMENSION REDUCTION

DATA MATRIX

DIMENSION REDUCTION

MS IMAGING DATA

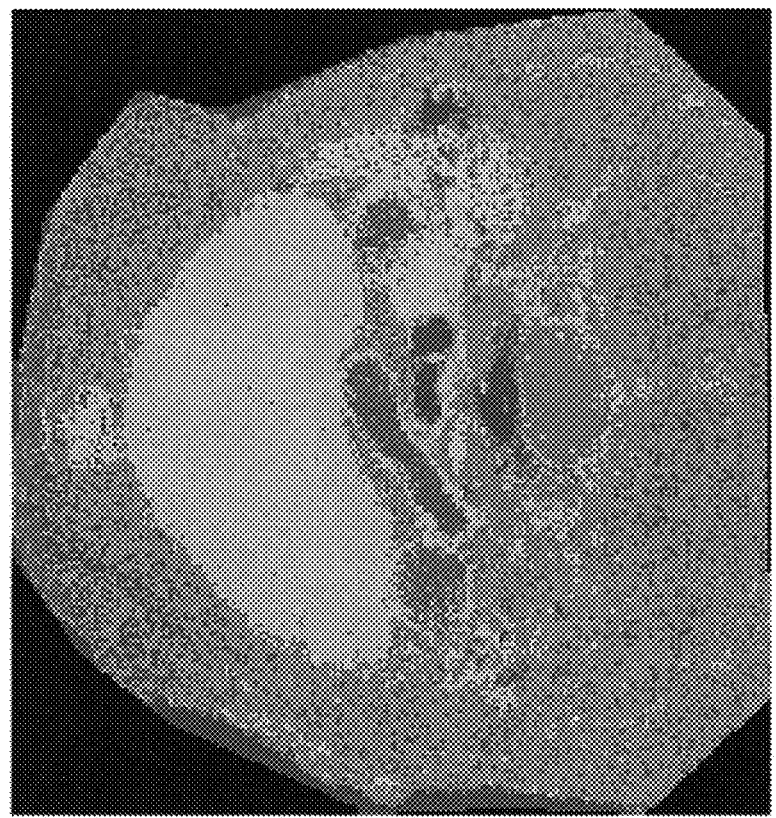
Fig. 5B
CONTROL SAMPLE
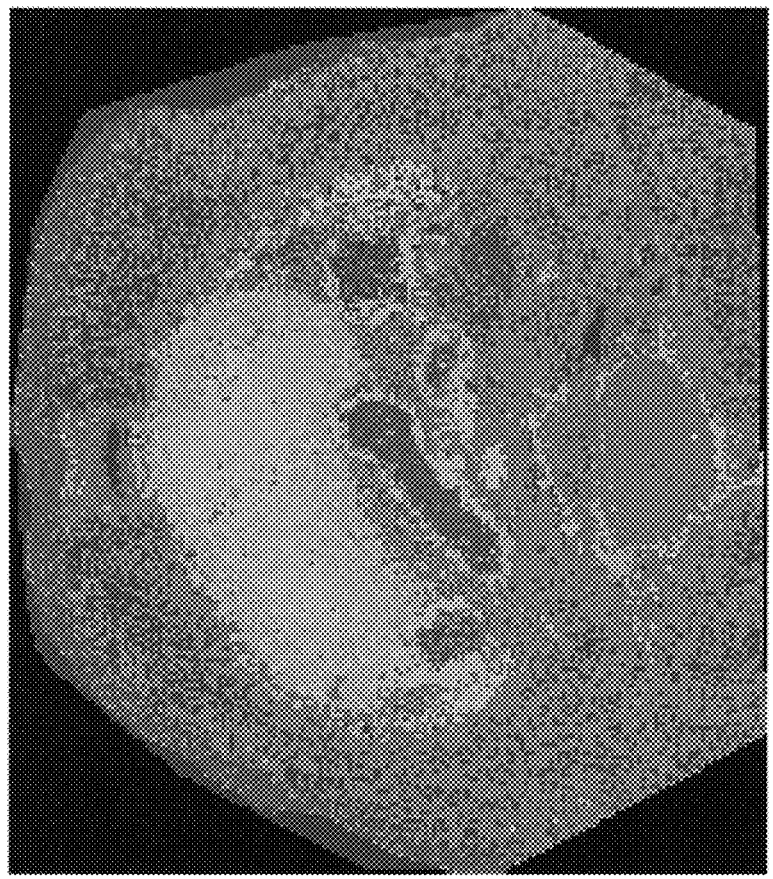
Fig. 5A
DRUG-ADMINISTERED MOUSE
THE SAME COLOR ASSIGNMENT APPLIED

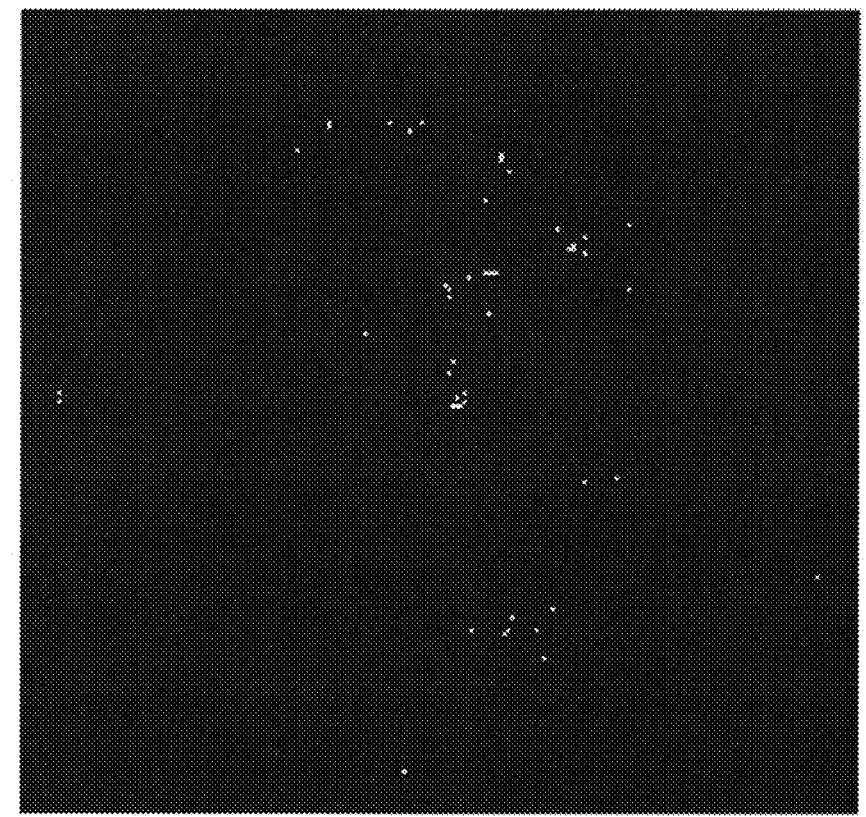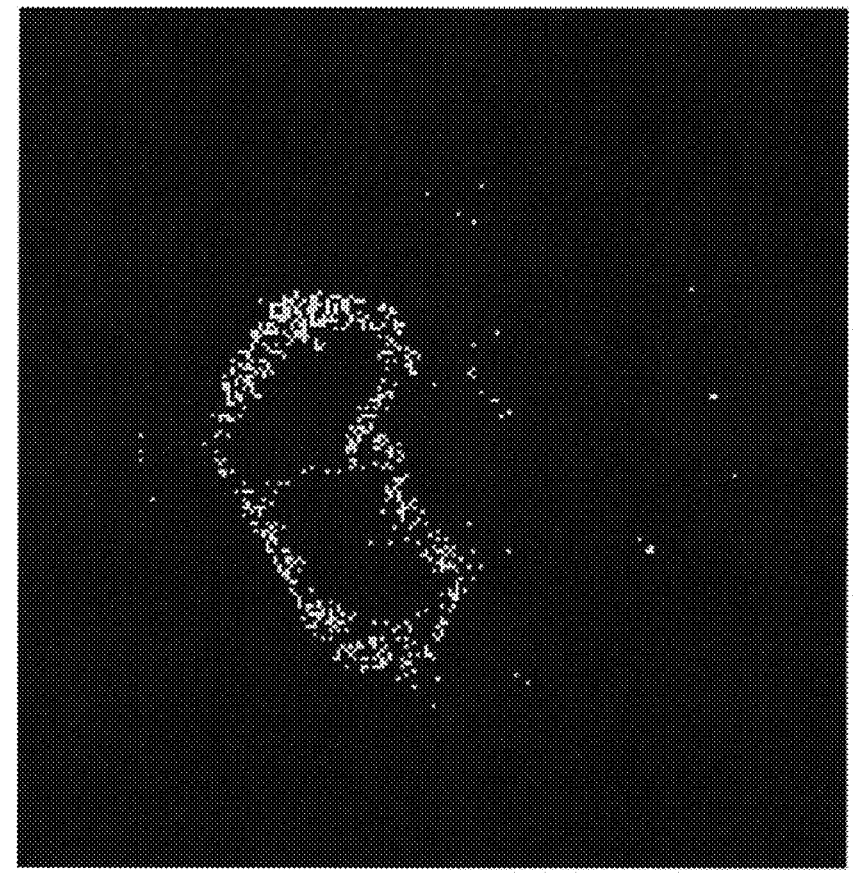

IMAGING MASS SPECTROMETER AND METHOD FOR IMAGING MASS SPECTROMETRY

TECHNICAL FIELD

The present invention relates to an imaging mass spectrometer and a method for imaging mass spectrometry.

BACKGROUND ART

An imaging mass spectrometer disclosed in Patent Literature 1 or other related documents includes an ion source employing a matrix-assisted laser desorption/ionization method. This type of mass spectrometer allows a user to observe the morphology of the surface of a section of biological tissue or similar type of sample through an optical microscope, and collects mass spectrum data over a predetermined range of mass-to-charge ratios (strictly speaking, this should be called "m/z", although the term "mass-to-charge ratio" is used in this description according to common practices) for each of the micro areas which are set within a desired two-dimensional area on the sample. In another commonly known method for imaging mass spectrometry, as disclosed in Patent Literature 2 or other related documents, a sample collection method called "laser microdissection" is used to cut out a piece of sample from each of the micro areas which are set within a desired two-dimensional area on a target sample. A liquid sample is prepared from each piece of the target sample and supplied to a mass spectrometer to obtain mass spectrum data for each micro area.

In any case, an imaging mass spectrometer extracts, for example, the signal intensity value at the mass-to-charge ratio of an ion originating from a specific compound from mass spectrum data acquired for each micro area on a sample (this type of data may hereinafter be called "MS imaging data"), and creates an image in which the extracted signal intensity values are arranged at the corresponding micro areas on the sample, to obtain an image showing the state of distribution of the specific compound (this type of image is hereinafter called "MS imaging graphic").

When the compound to be analyzed is previously known, or when the mass of the molecule of interest is previously known while the compound itself is unknown, it is possible to allow a user to specify the value of the mass-to-charge ratio corresponding to that compound or molecule, as described earlier, and display an MS imaging graphic which is of interest for the user. If the "similar image extraction" function provided in the mass spectrometry imaging data analysis software disclosed in Non Patent Literature 1 is used, it is possible, for example, to automatically search for a mass-to-charge ratio whose distribution is similar to the intensity distribution in the image of interest (i.e., an image previously acquired by a different imaging technique, such as a dye image or fluorescent image; or an MS imaging graphic previously acquired at a certain mass-to-charge ratio), as well as create and display an MS imaging graphic at that mass-to-charge ratio.

On the other hand, when the compound to be focused on is unknown or indeterminable, or when an image which should be referred to in the automatic search for the compound has not been obtained, it is necessary, for example, for an operator (user) to visually search MS imaging graphics for an image which draws the operator's interest. In normal cases, however, there are a considerable number of MS imaging graphics. It requires an extreme amount of time and labor for the operator to visually check each of those graphics. Furthermore, even when a considerable amount of task and labor is spent for such a task, omissions cannot be completely eliminated. Therefore, it is difficult to ensure a sufficient level of reliability of the analysis.

To address such a problem, the "image classification" function provided in the mass spectrometry imaging data analysis software disclosed in Non Patent Literature 1 can be used to classify a large number of MS imaging graphics into a plurality of clusters (groups). With such an automatic image classification, the software can provide the user with an average image for each cluster and information related to the mass-to-charge-ratio values included in that cluster. The user can refer to those items of information to find a cluster which draws the user's interest, and conduct a detailed search of the images in that cluster. Such a function reduces, to a certain extent, the workload on the user searching for an image.

CITATION LIST

Patent Literature

Patent Literature 1: JP 2013-68565 A
Patent Literature 2: WO 2015/053039 A

Non Patent Literature

Non Patent Literature 1: "Mass Spectrometry imaging Data Analysis Software IMAGEREVEAL MS Ver.1.1", a product catalogue by Shimadzu Corporation, first edition published in January 2020

Non Patent Literature 2: Leland McInnes and two other authors, "UMAP: Uniform Manifold Approximation and Projection for Dimension Reduction", [online], [Jun. 1, 2020], arXiv, the Internet.

SUMMARY OF INVENTION

Technical Problem

A commonly used technique for the computational processing for the aforementioned type of image classification is hierarchical clustering analysis (MCA). This technique has the drawback of being inefficient or computationally expensive since a considerable length of time is needed for the calculation by a computer. Another drawback exists in that the average images respectively obtained for clusters by HCA are not independent of each other within a space for discrimination, so that the difference between the clusters in terms of the distribution is difficult to discern. Still another problem is that in the case of classifying images on the basis of a plurality of sets of data respectively obtained for a plurality of samples, the criteria for the image classification should be changed from one sample to another, making it difficult to compare classified images acquired for different samples.

The present invention has been developed to solve at least one of those problems. Its primary objective is to provide an imaging mass spectrometer and a method for imaging mass spectrometry which make it possible to efficiently find the distribution of a substance which draws the interest or attention of the user, as well as to accurately and efficiently locate areas having similar distributions of the substance or areas having different distributions of the substance among a plurality of samples.

Solution to Problem

One mode of the imaging mass spectrometer according to the present invention developed for solving the previously described problems includes:

a measurement section configured to perform a mass spectrometric analysis for each of a plurality of micro areas which are set within a measurement area on a target sample;

a dimension reduction processor configured to perform data processing by a non-linear dimension reduction method using manifold learning on mass spectrometric data for each micro area acquired by the measurement section, to obtain, for each micro area, a set of data reduced to three dimensions from the dimensions corresponding to the number of mass-to-charge-ratio values;

a display color determiner configured to determine a color for each of a plurality of points corresponding to the data of the micro areas after dimension reduction by the dimension reduction processor, by arranging those points within a three-dimensional space having three axes representing the three dimensions, with three primary colors respectively assigned to the three axes; and a segmentation image creator configured to create a segmentation image corresponding to the measurement area or a partial area in the measurement area, by arranging, on two dimensions, pixels which respectively correspond to the points within the three-dimensional space, where each pixel has a color given to the point corresponding to the pixel and is located according to the position within the measurement area of the micro area corresponding to the point.

One mode of the method for imaging mass spectrometry according to the present invention developed for solving the previously described problem includes:

a measurement step configured to perform a mass spectrometric analysis for each of a plurality of micro areas which are set within a measurement area on a target sample;

a dimension reduction processing step configured to perform data processing by a non-linear dimension reduction method using manifold learning on mass spectrometric data for each micro area acquired in the measurement step, to obtain, for each micro area, a set of data reduced to three dimensions from the dimensions corresponding to the number of mass-to-charge-ratio values;

a display color determination step configured to determine a color for each of a plurality of points corresponding to the data of the micro areas after dimension reduction in the dimension reduction processing step, by arranging those points within a three-dimensional space having three axes representing the three dimensions, with three primary colors respectively assigned to the three axes; and a segmentation image creation step configured to create a segmentation image corresponding to the measurement area or a partial area in the measurement area, by arranging, on two dimensions, pixels which respectively correspond to the points within the three-dimensional space, where each pixel has a color given to the point corresponding to the pixel and is located according to the position within the measurement area of the micro area corresponding to the point.

In the previously described mode of the imaging mass spectrometer according to the present invention, the measurement section may have any type of configuration as long as it can acquire mass spectrometric data for a compound present at each micro area while maintaining the position information of each micro area within the measurement area on a target sample. Accordingly, for example, the measurement section may be configured to perform a mass spectrometric analysis while directly casting a laser beam or the like for ionization onto a target sample having a two-dimensional extent, or it may be configured to collect a micro-sized sample piece from the target sample by laser microdissection or other techniques, and to perform a mass spectrometric analysis (or chromatograph mass spectrometric analysis) on a sample prepared from each collected piece of the target sample.

Advantageous Effects of Invention

As for the "non-linear dimension reduction method using manifold learning", the technique called "UMAP" proposed in Non Patent Literature 2 or other related documents can be used. This type of dimension reduction method can separate data that cannot be sufficiently separated from each other by linear dimension reduction methods represented by principal component analysis. Although this depends on the kind of technique, non-linear dimension reduction can normally shorten the calculation time on a computer as compared to the hierarchical cluster analysis or similar techniques. Since two or more points which respectively correspond to different micro areas within the measurement area rarely coincide with each other (come to the same spatial position) within the three-dimensional space, each pixel in the segmentation image has a roughly different color from each other. Therefore, the situation rarely occurs in which it is difficult to discern a difference in distribution when comparing a plurality of segmentation images. The user can accurately locate areas which are different from each other in terms of the shape of distribution, or areas which have similar shapes of distribution, among a plurality of segmentation images.

Thus, according to the previously described modes of the present invention, the distribution of a substance which draws the interest or attention of the user can be found efficiently, i.e., without requiring cumbersome tasks or too much time. The user can accurately and efficiently locate areas which are similar to or different from each other in terms of the distribution of a substance among a plurality of samples.

BRIEF DESCRIPTION OF DRAWINGS

FIGS. 5A and 5B show one example of the segmentation images in the imaging mass spectrometer according to the present embodiment.

FIGS. 6A and 6B show one example of the images obtained by extracting pixels of a specific color from the segmentation images shown in FIGS. 5A and 5B.

DESCRIPTION OF EMBODIMENTS

An imaging mass spectrometer as one embodiment of the present invention is hereinafter described with reference to the attached drawings

[System Configuration of Present Embodiment]

Figure 1:
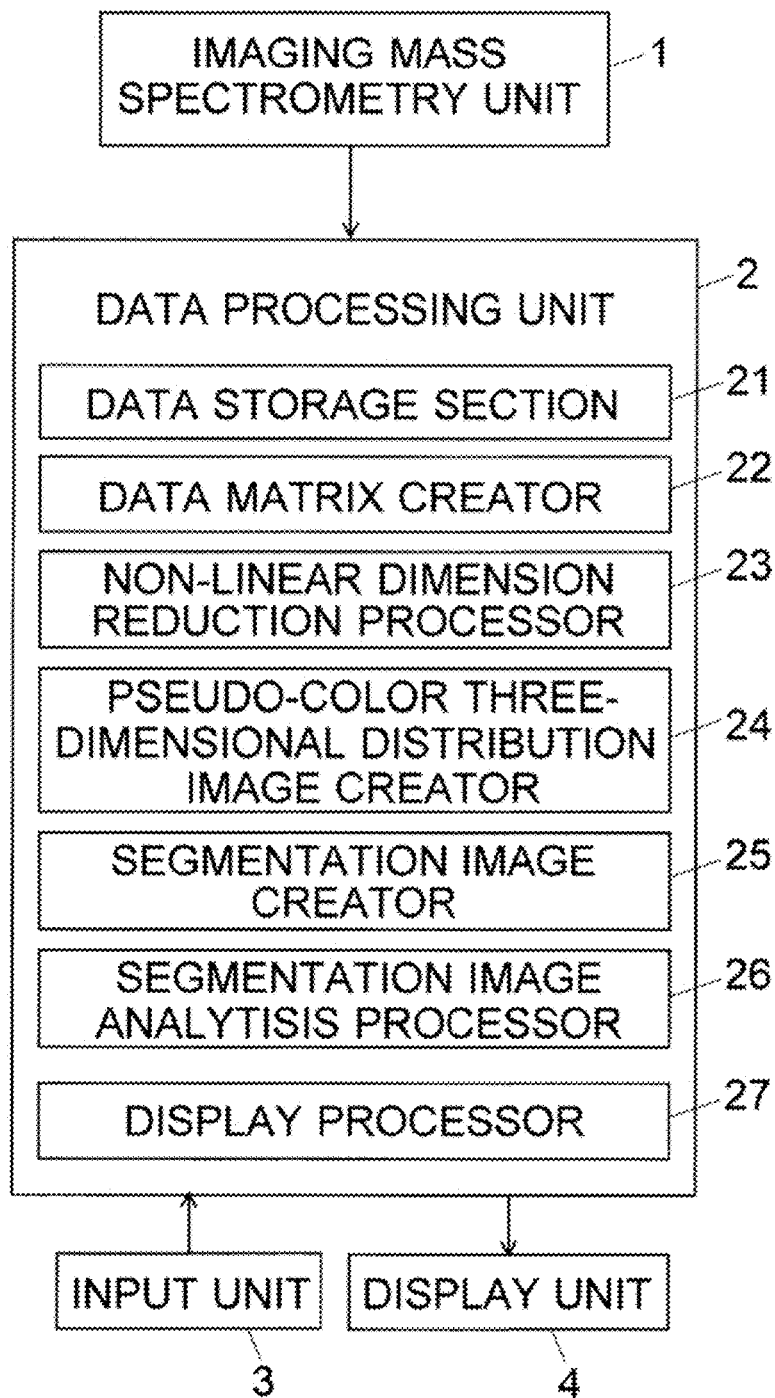
FIG. 1 is a schematic block configuration diagram of an imaging mass spectrometer as one embodiment of the present invention.

FIG. 1 is a schematic block configuration diagram of the imaging mass spectrometer according to the present embodiment.

As shown in FIG. 1, the imaging mass spectrometer according to the present embodiment includes an imaging mass spectrometry unit 1, data processing unit 2, input unit 3 and display unit 4.

As the imaging mass spectrometry unit 1, for example, an atmospheric pressure MALDI ion nap time-of-flight mass spectrometer as disclosed in Patent Literature 1 can be used. A system disclosed in Patent Literature 2 may also be used, which is a combination of a laser microdissection device and a mass spectrometer configured to perform a mass spectrometric analysis on a sample prepared from as micro-sized sample piece collected from a target sample by the laser microdissection device.

The data processing unit 2 includes, as its functional blocks, a data storage section data Matrix Creator 22, non-linear dimension reduction processor 23, pseudo-color three-dimensional distribution image creator 24, segmentation image creator 25, segmentation image analysis processor 26, and display processor 27.

In the system according to the present embodiment, the data processing unit 2 normally includes a personal computer or more sophisticated workstation as its main component, on which the aforementioned functional blocks can be embodied by running, on the computer, dedicated data-processing software installed on the same computer. In that case, the input unit 3 includes a keyboard and pointing device (e.g., mouse) provided for the computer, while the display unit 4 includes a display monitor.

[Analytical Processing in System According to Present Embodiment]

Figure 2:
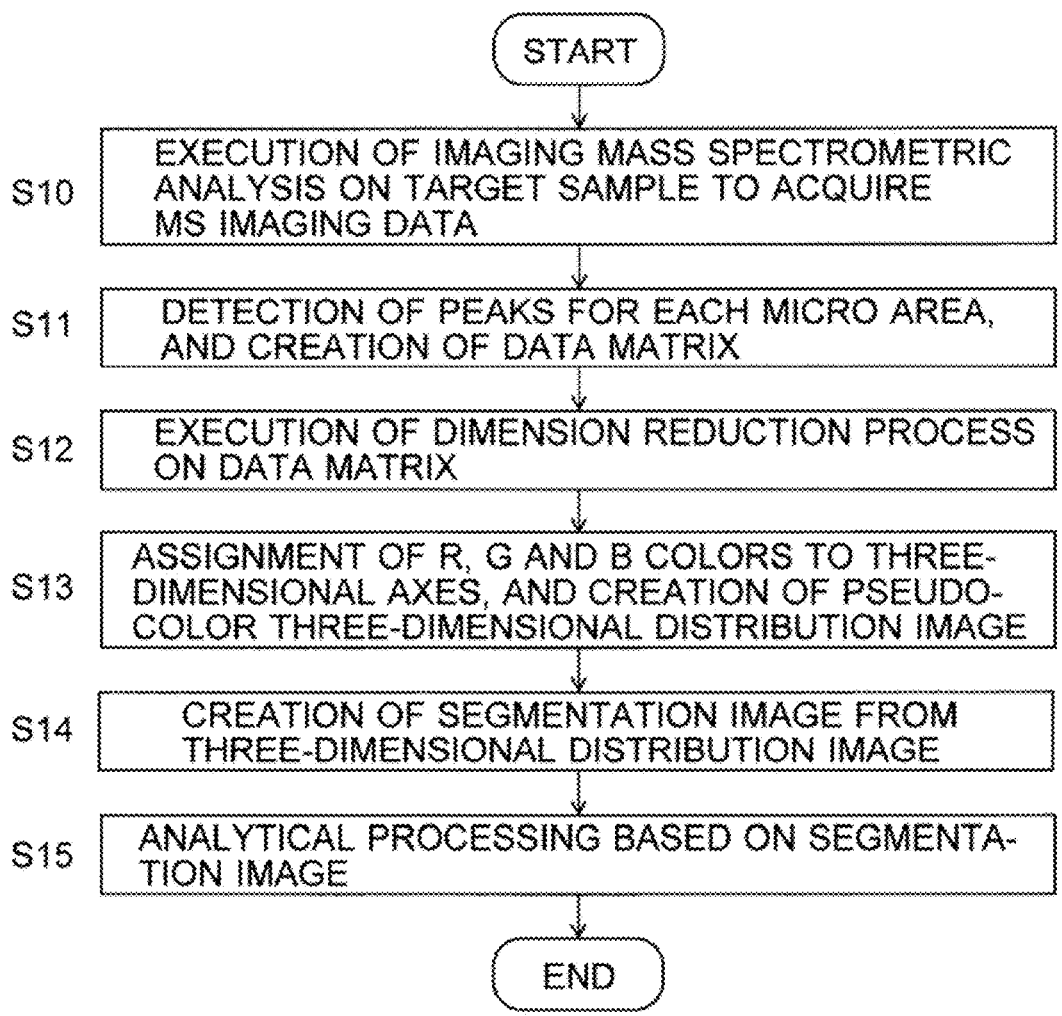
FIG. 2 is a flowchart showing one example of the procedure of the analytical processing in the imaging mass spectrometer according to the present embodiment.

The procedure of the analytical processing in the imaging mass spectrometer according to the present embodiment is hereinafter described with reference to FIGS. 2 and 3A-3D. FIG. 2 is a flowchart showing the procedure of the analytical processing. FIGS. 3A-3D are schematic diagrams for explaining the analytical processing.

An example of the target of a measurement by the imaging mass spectrometry unit 1 is a section sample which is a slice of biological tissue taken from the brain, an internal organ or similar part of a laboratory animal. The sample is placed on a sample plate. After a matrix is applied to the sample, the sample plate is set at a predetermined position in the imaging mass spectrometry unit 1.

Figure 3D:
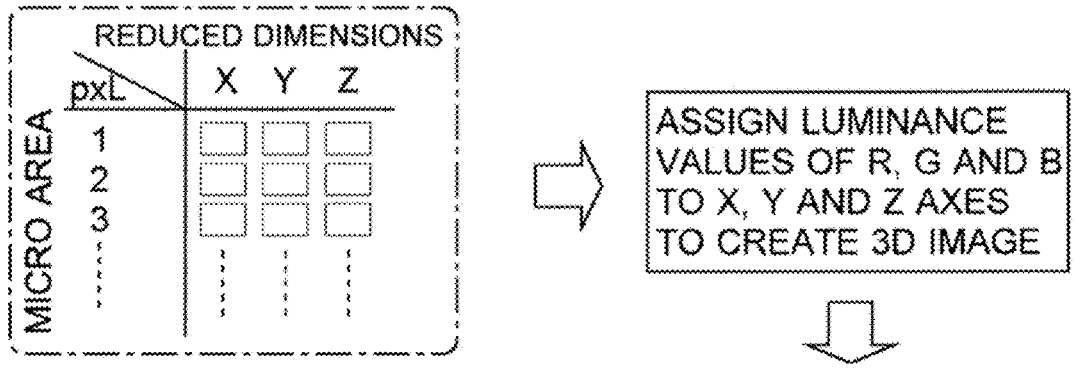
FIGS. 3A-3D are schematic diagrams for explaining the analytical processing, in the imaging mass spectrometer according to the present embodiment.
Figure 3C:
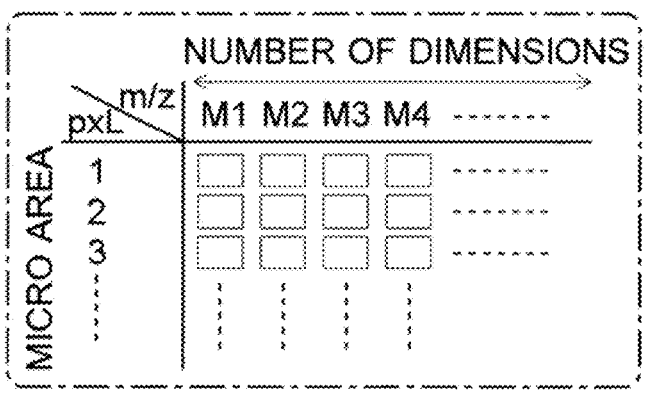
Figure 3B:
Figure 3A:
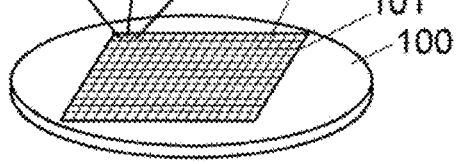

As shown in FIG. 3A, the imaging mass spectrometry unit 1 performs a mass spectrometric analysis and acquires mass spectrometric data over a predetermined mass-to-charge-ratio range for each of the micro areas 102 formed by dividing a predetermined measurement area 101 on the sample 100 into a fine grid-like form (Step S10).

In place of the normal type of mass spectrometric anal sis, an MS/MS analysis or MS$^n$ analysis may be performed in which an ion having a specific mass-to-charge ratio or falling within a specific mass-to-charge-ratio range is selected as a precursor ion to acquire production spectrum data.

Specifically, one micro area 102 is irradiated with a laser beam for a short period of time to generate ions originating from compounds present in the micro area 102. Those ions are temporarily held within an ion trap and subsequently sent into a time-of-flight mass separator to separate the ions according to their mass-to-charge ratios and individually detect those ions. Such a series of operations are performed repeatedly, with the position of the sample 100 gradually changed so that the laser irradiation point gradually moves on the sample 100, to ultimately collect mass spectrum data for all Micro areas 102 within the measurement area 101. In FIG. 3B, pxL-1, pxL-2, ..., represent the numbers assigned to the micro areas 102.

The mass spectrum data collected at each micro area 102 in the previously described manner, i.e., MS imaging data for the entire measurement area 101, are stored in the data storage section 21 of the data processing unit 2. At an appropriate point in time, an instruction for performing an analysis is entered from the input unit 3 by a user, whereupon the data matrix creator 22 reads those MS imaging data from the data storage section 21, detects peaks in each set of mass spectrum data according to predetermined criteria, and determines the mass-to-charge-ratio value and signal-intensity value of each peak. Then, the data matrix creator 22 collects the mass-to-charge-ratio values and signal-intensity values of the peaks detected in all mass spectrum data acquired for the micro areas, to create a data matrix as shown in FIG. 3C (Step S11).

In the data matrix according to the example shown in FIG. 3C, the signal-intensity values each of which has been acquired at one micro area for one mass-to-charge ratio value are arranged as the elements of matrix, with the serial numbers of all micro areas vertically arrayed and the mass-to-charge-ratio values (M1, M2, M3, ...) of all peaks horizontally arrayed. If the sample is of biological origin, it is normally the case that an extremely large number of compounds are contained in the sample, and numerous peaks appear on one mass spectrum. Accordingly, the number of mass-to-charge-ratio values in the data matrix (i.e., the number of columns of the matrix shown in FIG. 3C, which equals the number of dimensions) is extremely large.

Next, the non-linear dimension reduction processor 23 performs a process on the data matrix for reducing, the dimensions in the mass-to-charge-ratio direction (Step S12).

Methods for reducing the dimensions of data are roughly divided into the projection method and manifold learning. The former technique is primarily a linear dimension reduction method, while the latter is primarily a non-linear dimension reduction method. Examples of the projection method include principal component analysis (PCA), cluster analysis, and independent component analysis (ICA). Examples of the manifold learning include locally linear embedding (LLE), Isomap, t-distributed stochastic neighbor embedding (t-SNE), and uniform manifold approximation and projection (UMAP). Among those, examples, UMAP, which is disclosed in Non Patent Literature 2, is as new non-linear dimension reduction method proposed in 2018. Unlike PCA UMAP cannot calculate the loadings. However, this technique can separate even such data that cannot be separated by linear dimension reduction methods. Furthermore, UMAP can perform computations considerably faster than even t-SNE. Another feature of UMAP is that it allows a new data point to be added to an existing (embedded) model.

From these facts, UMAP is used for dimension reduction in the system according to the present embodiment. Detailed theoretical explanations of UMAP are available in Non Patent Literature 2 or other related documents. There are also programs available to the public for implementing UMAP. Accordingly, no theoretical explanation of UMAP is given in this specification. By applying the dimension reduction by UMAP to multi-dimensional data (whose number of dimensions is equal to the number of mass-to-charge-ratio values) as shown in FIG. 3C, the data whose number of dimensions is equal to the number of mass-to-charge-ratio values are compressed into three-dimensional data. In other words, the data matrix shown in FIG. 3C is transformed to a three-column data matrix as shown in FIG. 3D.

Next, the pseudo-color three-dimensional distribution image creator 24 assigns a color to a point corresponding to one of the micro areas by designating the three colors of red (R), green (G) and blue (B) to the three-dimensional axes of X, Y and Z after the dimension reduction, using the data values (intensity values) as the luminance values of the three colors. Then, the pseudo-color three-dimensional distribution image creator 24 creates a pseudo-color three-dimensional distribution image in which the colored points are arranged within the three-dimensional space having the three axes of X, Y and Z directed orthogonally to each other (Step S13). The processing of Steps S12 and S13 can be interpreted as a process for aggregating, for each micro area, a large number of peaks observed at different mass-to-charge-ratio values on a mass spectrum into the three peaks of R, G and B.

Figure 4:
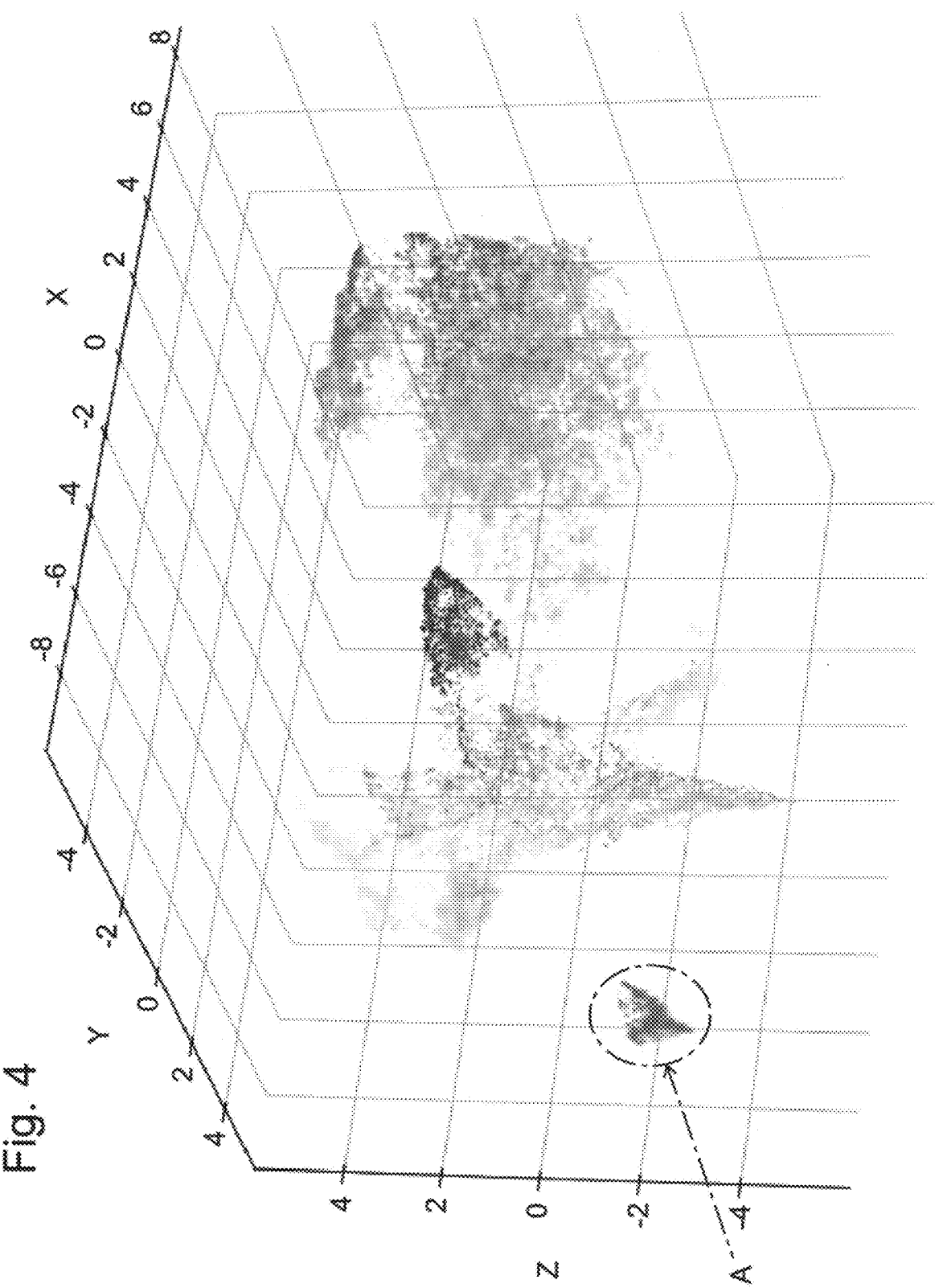
FIG. 4 is a diagram showing one example of the pseudo-color three-dimensional distribution image after dimension reduction in the imaging mass spectrometer according to the present embodiment.

FIG. 4 is one example of the pseudo-color three-dimensional distribution image obtained by performing the previously described processing of Steps S11-S13 on MS imaging data collected by performing an imaging mass spectrometric analysis on a sample piece cut from the chest area of a mouse. The points in FIG. 4 respectively correspond to the micro areas 102 within the measurement area 101 and each point has a different color depending on its position within the three-dimensional space. In other words, a unique color is assigned to each micro area in this three-dimensional distribution image. The display processor 27 can display this pseudo-color three-dimensional distribution image on the screen of the display unit 4.

As just described, the points in the pseudo-color three-dimensional distribution image respectively correspond to the micro areas 102 within the original measurement area 101. Accordingly, for each of those points, the segmentation image creator 25 identifies the display color assigned to that point, assigns the same color to the pixel corresponding to the micro area related to the point concerned, and puts that pixel at the position of the corresponding micro area 102 within the measurement area 101 to create a two-dimensional image. This two-dimensional image is a segmentation image in which similar areas are panned with similar colors, thereby providing an overview of a large number of MS imaging data acquired at different mass-to-charge ratios (Step S14). The display processor 27 displays the thus created segmentation image on the screen of the display unit 4.

The conventional mass spectrometry imaging data analysis software disclosed in Non Patent Literature 1 also has a "segmentation" function. The segmentation process includes calculating the similarities (distances) between data points (pixels) by HCA or other techniques to group the pixels into a plurality of clusters. Although the total number of clusters can be specified as one of the parameters, that number is normally no greater than ten or so, and pixels belonging to the same cluster are displayed with the same color regardless of the degree of similarity. Therefore, it difficult to discern subtle differences between pixels. By comparison, in the system according to the present embodiment, as just described, each pixel has a substantially different display color from each other, making it easy to visually recognize a difference between pixels on the two-dimensional image.

FIG. 5A is a segmentation image obtained by performing the processing of Steps S10-S14 on a sample piece cut from the chest area of a mouse to which a predetermined kind of drug was administered. FIG. 5B is a segmentation image obtained by performing the processing of Steps S10-S14 using a sample piece cut from the chest area of a mouse with no drug administered (this sample is hereinafter called the "control sample"). As noted earlier, UMAP allows a new data point to be added to an existing model. This means that the same dimension reduction model and the same color assignment can be applied to two or more sets of data obtained from different samples, thereby allowing the segmentation to be performed with the same criterion. The segmentation images in FIGS. 5A an 5B have been created in such a manner. Areas having the same color in those images can be considered to be areas containing the same compound. Accordingly, the user can compare those segmentation images which respectively correspond to different samples, and visually evaluate, for example, a change in the size or position of the area which is likely to contain the same compound.

The segmentation image is also useful when the user selects a region of interests (ROI). Accordingly, in the case where the points in the pseudo-color three-dimensional distribution image can be divided into a plurality of groups, a segmentation image sectioned into areas each of which includes one group may be created and displayed in place of the segmentation image in its original form. This allows the user to easily select an ROI as well as easily recognize an area including similar pixels.

The segmentation image analysis processor 26 further performs various types of analytical processing based on the created segmentation images according to user operations. The display processor 27 shows the result of the analysis on the display unit 4 (Step S15).

[Various Analytical Techniques Using Segmentation Image]

Examples of the analytical processing performed by the segmentation image analysis processor 26 are hereinafter described.

As noted earlier, in the case of using UMAP as the nor-linear dimension reduction method, areas having the same color in the segmentation images acquired for different samples as shown in FIGS. 5A and 5B can be considered as areas which contain the setae compound. Accordingly, the segmentation image analysis processor 26 extracts, from each segmentation image, only the pixels having a specific color according to a user instruction. The display processor 27 displays an image showing the distribution of the extracted pixels on the display unit 4.

FIGS. 6A and 6B shown an example of the images created by extracting pixels of the same specific color from the segmentation images shown in FIGS. 5A and 5B. The areas shown in FIGS. 6A and 6B can be considered as areas containing the same compound. Therefore, by comparing those images, the user can find distributions which exhibit a difference or similarity between the control and drug-administered individuals.

The number of colors in the segmentation images is dramatically smaller than that of the m/z values before the dimension reduction. However, in normal cases, the number of colors will be as many as 300. Therefore, a user who investigates differences in distribution or other aspects of the images for each specific color must compare as many as 300 images. In order to further reduce the burden of performing this task, it is preferable to give priority, in order of the degree of singularity, to the images obtained by extracting specific colors when presenting the image to the user. Specifically, for example, for each set of images showing pixels of a specific color obtained from segmentation images corresponding to a plurality of samples to be compared, the segmentation image analysis processor 26 may calculate the difference in the number of bright points (i.e., pixels having the specific color), give a higher degree of priority to the set of images having a larger difference, and display the images in order of priority.

In some cases, it may be important to confirm, through the comparison, that the number of bright points is roughly uniform among the images corresponding to a plurality of samples to be compared while the distribution pattern varies from image to image. To obtain such a type of information, the segmentation image analysis processor 26 may be configured to initially perform, on images obtained by extracting a specific color, a filtering process for blurring the images to divide the luminance values into a plurality of ranks according to their patterns, and subsequently create a luminance histogram and conduct a test on the histogram. If the images are similar to each other to a certain extent, it is possible to use, for example, a method which includes lowering the resolution of the images (e.g., by replacing 3×3 or 4×4 pixels by one pixel), converting the number of bright points within each area formed by the low-resolution grid into the luminance value of that area, and calculating the correlation between two images.

Figure 7:
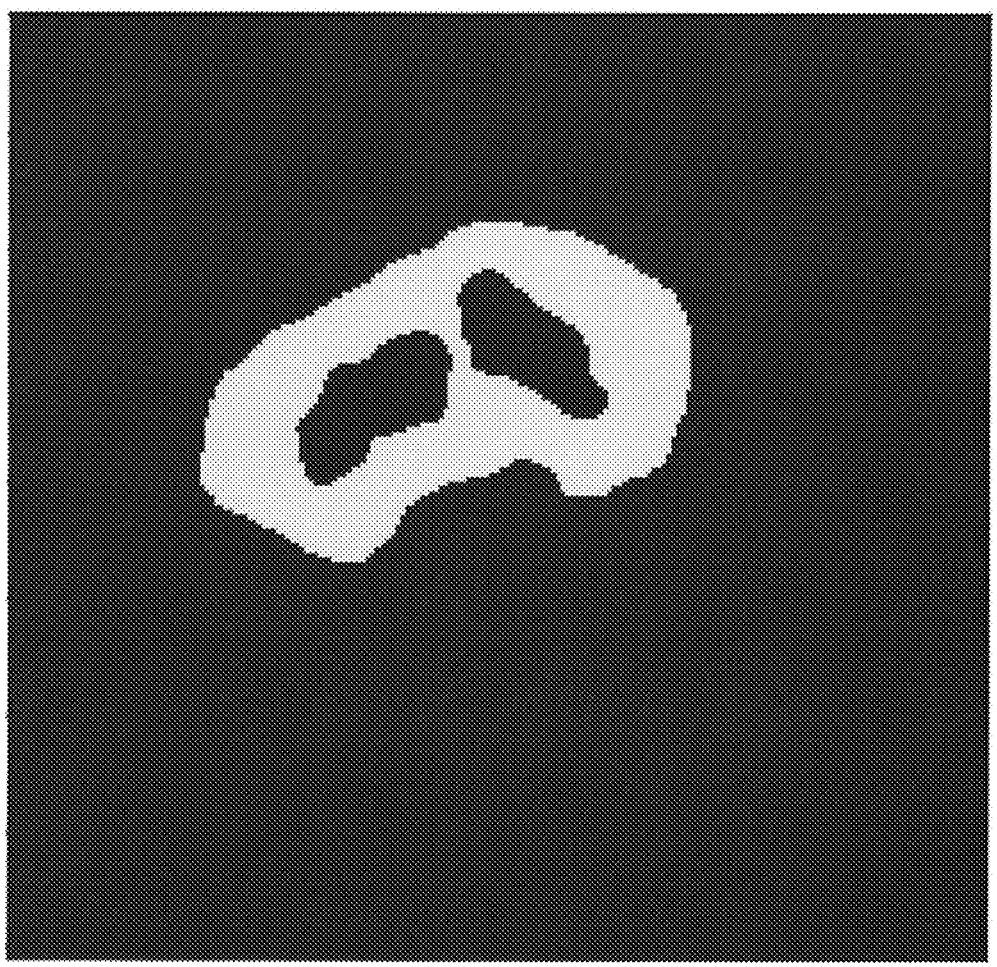
FIG. 7 is an area image created by performing an image-processing operation on the image shown in FIG. 6A.

In the case where the user selects an ROI from a segmentation image in the previously described manner, the ROI can be determined by appropriately processing images obtained by extracting pixels of a specific color. For example, in the image shown in FIG. 6A, although the bright points are discretely distributed, an area in which the bright points are present with a high level of density can be treated as one homogeneous area by an appropriate image processing, such as closing and noise removal processes. FIG. 7 is an example of the ROI image obtained by performing a predetermined image processing on the image shown in FIG. 6A.

For example, a plurality of ROIs can be set by such a processing, and a computation for statistically extracting characteristic peaks can be performed for each ROI. Images obtained by decomposing a segmentation image into a plurality of colors can be used as reference images for the image processing, described as the "similar image extraction" in Non Patent Literature 1.

It is also possible to set an ROI on a pseudo-color three-dimensional distribution image as shown in FIG. 4. For example, the group of points labelled "A" in FIG. 4 has a distinct spatial distance from the other points, forming one group. Accordingly, the user operating the input unit 3 specifies a group of points for which an ROI should be set on the displayed pseudo-color three-dimensional distribution image. For example, using a pointing device, the user draws a line surrounding the group of target points. Then, the segmentation image analysis processor 26 creates a two-dimensional image in which a predetermined color is given to only the pixels corresponding to the specified points. If the selected pixels are located close to each other on the sample, an image as shown in FIG. 7, for example, will be obtained, which can be used as the ROI image.

[Modified Examples]

In the description of the previous embodiment, the MS imaging data of the entire measurement range are used as the basis for performing the dimension reduction to create a pseudo-color three-dimensional distribution image. Similar processing can also be performed on MS imaging data included in only a portion of the measurement area, e.g., a specific ROI.

In the previous description, there are two samples to be compared, and the non-linear dimension reduction is performed on MS imaging data obtained for each sample, to create segmentation images. Similar processing can be performed on a plurality of MS imaging data respectively obtained for three or more samples.

Even in that case, it is preferable to use the same system of colors for dimension-reduced data obtained from MS imaging data respectively related to different samples, to create three-dimensional distribution images or segmentation images.

An appropriate type of statistical analysis, such as principal component analysis or cluster analysis, may be performed on the data constituting segmentation images respectively obtained from a plurality of samples, by treating one color assigned to the pixels on the segmentation images as a new variable. Such a statistical analysis makes it possible, for examples, to compare segmentation images in terms of the number of pixels of a given color or ratio of that color, as well as to visualize those results using a graph or the like.

For segmentation images respectively obtained for a plurality of samples which, for example, have similar tendencies, multiple regression analysis can be performed on the basis of the degree of that tendency, to find a color whose area changes along the extent of the degree of that tendency.

In the description of the previous embodiment, segmentation images are created for a sample having a two-dimensional extent. The previously described technique can also be applied to a series of sections of an organ or similar type of sample having a three-dimensional size, to obtain a segmentation image for each section and reconstruct a three-dimensional segmentation image from the plurality of segmentation images.

As described earlier, in the imaging mass spectrometer according to the present embodiment, MS imaging data having an extremely large number of dimensions are projected onto three dimensions, and the three colors of R, G and B are respectively assigned to the three-dimensional axes. Consequently, each pixel on a segmentation image will have one specific color into which information concerning a plurality of peaks observed on a mass spectrum is aggregated. This method has the following advantages in addition to the ones already described.

(1) The number of segmentations (number of colors on the segmentation image) can be easily changed.

In the case of performing the segmentation by K-means clustering or other techniques, changing the number of segmentations requires the entire computation to be performed once more, requiring a corresponding amount of time. In the case of the previously described method, the kinds and number of colors can be easily changed by merely changing the number of tone levels of the luminance of the colors assigned to the three axes and/or direction of the luminance. Since it is unnecessary to perform the entire computation for the dimension reduction from the start, the period of time for the processing will be dramatically reduced.

(2) Since the pseudo-color three-dimensional distribution image, and the segmentation image which is a planer view corresponding to the top surface of the real sample, are linked with each other by the same system of colors, it is easy for the user to visually understand the relationship between the two images.

This allows for various operations, such as the creation of an ROT image for data points selected on a pseudo-color three-dimensional distribution image, as described earlier. It is also possible to configure the system so that when a specific operation has been performed on a data point on the three-dimensional distribution image, or specifically, for example, when a data point has been selected to change its color, or when a specific data point has been deleted, the result of that operation is reflected on the two-dimensional segmentation image, or vice versa.

It should be noted that the previously described embodiment and modified examples are mere examples of the present invention. Any change, modification, addition or the like appropriately made within the spirit of the present invention will naturally fall within the scope of claims of this application.

[Various Modes of Invention]

A person skilled in the art can understand that the previously described illustrative embodiment is a specific example of the following modes of the present invention.

(Clause 1) One mode of the imaging mass spectrometer according to the present invention includes:

a measurement section configured to perform a mass spectrometric analysis for each of a plurality of micro areas which are set within a measurement area on a target sample;

a dimension reduction processor configured to perform data processing by a non-linear dimension reduction method using manifold learning on mass spectrometric data for each micro area acquired by the measurement section, to obtain, for each micro area, a set of data reduced to three dimensions from the dimensions corresponding to the number of mass-to-charge-ratio values;

a display color determiner configured to determine a color for each of a plurality of points corresponding to the data of the micro areas after dimension reduction by the dimension reduction processor, by arranging those points within a three-dimensional space having three axes representing the three dimensions, with three primary colors respectively assigned to the three axes; and a segmentation image creator configured to create a segmentation image corresponding to the measurement area or a partial area in the measurement area, by arranging, on two dimensions, pixels which respectively correspond to the points within the three-dimensional space, where each pixel has a color given to the point corresponding to the pixel and is located according to the position within the measurement area of the micro area corresponding to the point.

(Clause 6) One mode of the method for imaging mass spectrometry according to the present invention includes:

a measurement step configured to perform a mass spectrometric analysis for each of a plurality of micro areas which are set within a measurement area on a target sample;

a dimension reduction processing step configured to perform data processing by a non-linear dimension reduction method using manifold learning on mass spectrometric data for each micro area acquired in the measurement step, to obtain, for each micro area, a set of data reduced to three dimensions from the dimensions corresponding to the number of mass-to-charge-ratio values;

a display color determination step configured to determine a color for each of a plurality of points corresponding to the data of the micro areas after dimension reduction in the dimension reduction processing step, by arranging those points within a three-dimensional space having three axes representing the three dimensions, with three primary colors respectively assigned to the three axes; and a segmentation image creation step configured to create a segmentation image corresponding to the measurement area or a partial area in the measurement area, by arranging, on two dimensions, pixels which respectively correspond to the points within the three-dimensional space, where each pixel has a color given to the point corresponding to the pixel and is located according to the position within the measurement area of the micro area corresponding to the point.

By the imaging mass spectrometer described in Clause 1 and the method for imaging mass spectrometry described in Clause 6, the distribution of a substance which draws the interest or attention of the user can be efficiently found, i.e., without requiring cumbersome tasks or too much time. The user can accurately and efficiently locate areas which are similar to or different from each other in terms of the distribution of a substance among a plurality of samples.

(Clauses 2 and 7) In the imaging mass spectrometer described in Clause 1 and the method for imaging mass spectrometry described in Clause 6, the non-linear dimension reduction method may be a method based on UMAP.

By the imaging mass spectrometer described in Clause 2 and the method for imaging mass spectrometry described in Clause 7, a satisfactory separation of the points within the three-dimensional space after the dimension reduction can be achieved while reducing the computing time. A segmentation image which are more appropriately divided into similar areas can thereby be obtained.

(Clause 3) The imaging mass spectrometer described in Cause 1 or 2 may further include:

a three-dimensional image display processor configured to create a three-dimensional distribution image in which the points each having a color determined by the display color determiner are arranged within the three-dimensional space, and to display the three-dimensional distribution image on a display unit;

a point-selecting operation section configured to allow a user to select one or more points on the displayed three-dimensional distribution image; and a two-dimensional image display processor configured to create a two-dimensional image explicitly showing an area which is occupied by one or more micro areas corresponding to the one or more points selected by the point-selecting operation section, or an area which is likely to be a set of micro areas mainly consisting of the one or more micro areas, and to display the two-dimensional image on the display unit.

(Clause 8) The method for imaging mass spectrometry described in Clause 6 or 7 may further include:

a three-dimensional image display step configured to create a three-dimensional distribution image in which the points each having a color determined in the display color determination step are arranged within the three-dimensional space, and to display the three-dimensional distribution image on a display unit;

a point-selecting operation step configured to allow a user to select one or more points on the displayed three-dimensional distribution image; and a two-dimensional image display step configured to create a two-dimensional image explicitly showing an area which is occupied by one or more micro areas corresponding to the one or more points selected in the point-selecting operation step, or an area which is likely to be a set of micro areas mainly consisting of the one or more micro areas, and to display the two-dimensional image on the display unit.

In the three dimensional distribution image, since the data points corresponding to the micro areas on the sample are arranged within a three-dimensional space, it is easy to visually recognize whether data points are close to or distant from each other. Therefore, by the imaging mass spectrometer described in Clause 3 and the method for imaging mass spectrometry described in Clause 8, when the user has selected, for example, a set of data points distinctly separated from the other data points on the three-dimensional image, a two-dimensional image which explicitly shows areas that are similar to each other m terms of the kind and quantity of a contained compound can be displayed.

(Clause 4) The imaging mass spectrometer described in one of Clauses 1-3 may further include a segmentation image display processor configured to display, on the same screen of a display unit, a plurality of segmentation images created based on a plurality of sets of data respectively acquired for a plurality of samples by the measurement section.

(Clause 9) The method for imaging mass spectrometry described in one of Clauses 6-8 may further include a segmentation image display step configured to display, on the same screen of a display unit, a plurality of segmentation images created based on a plurality of sets of data respectively acquired for a plurality of samples in the measurement step.

By the imaging mass spectrometer described in Clause 4 and the method for imaging mass spectrometry described in Clause 9, a plurality of segmentation images derived from different samples to be compared can be displayed next to each other, allowing the user to easily evaluate the difference in distribution or other relevant features.

(Clause 5) The imaging mass spectrometer described in one of Clauses 1-4 may further include a statistical analysis processor configured to perform, for each of a plurality of segmentation images created based on a plurality of sets of data respectively acquired for a plurality of samples by the measurement section, a predetermined statistical analysis concerning information obtained from each of the plurality of segmentation images.

(Clause 10) The method for imaging mass spectrometry described in one of Clauses 6-9 may further include a statistical analysis processing step configured to perform, for each of a plurality of segmentation images created based on a plurality of sets of data respectively acquired for a plurality of samples in the measurement step, a predetermined statistical analysis concerning information obtained from each of the plurality of segmentation images.

The "statistical analysis" in the present context is a commonly used technique for statistical analysis, such as multiple regression analysis. By the imaging mass spectrometer described in Clause 5 and the method for imaging mass spectrometry described in Clause 10, a type of information that cannot be easily recognized by simply viewing segmentation images, such as the difference in area between two regions of a specific color, can be accurately evaluated by a statistical analysis.

REFERENCE SIGNS LIST

1 Imaging Mass Spectrometry Unit
2 Data Processing Unit
21 Data Storage Section
22 Data Matrix Creator
23 Non-Linear Dimension Reduction Processor
24 Pseudo-Color Three-Dimensional Distribution Image Creator
25 Segmentation Image Creator
26 Segmentation Image Analysis Processor
27 Display Processor
3 Input Unit
4 Display Unit

The invention claimed is:

1. An imaging mass spectrometer, comprising:
   a measurement section configured to perform a mass spectrometric analysis for each of a plurality of micro areas which are set within a measurement area on a target sample;
   a dimension reduction processor configured to perform data processing by a non-linear dimension reduction method using manifold learning on mass spectrometric data for each micro area acquired by the measurement section, to obtain, for each micro area, a set of data reduced to three dimensions from dimensions corresponding to a number of mass-to-charge-ratio values;
   a display color determiner configured to determine a color for each of a plurality of points corresponding to the data of the micro areas after dimension reduction by the dimension reduction processor, by arranging those points within a three-dimensional space having three axes representing the three dimensions, with three primary colors respectively assigned to the three axes; and
   a segmentation image creator configured to create a segmentation image corresponding to the measurement area or a partial area in the measurement area, by arranging, on two dimensions, pixels which respectively correspond to the points within the three-dimensional space, where each pixel has a color given to the point corresponding to the pixel and is located according to a position within the measurement area of the micro area corresponding to the point.

2. The imaging mass spectrometer according to claim 1, wherein the non-linear dimension reduction method is a method based on uniform main fold approximation and projection for dimension reduction (UMAP).

3. The imaging mass spectrometer according to claim 1, further comprising:
   a three-dimensional image display processor configured to create a three-dimensional distribution image in which the points each having a color determined by the display color determiner are arranged within the three-dimensional space, and to display the three-dimensional distribution image on a display unit;
   a point-selecting operation section configured to allow a user to select one or more points on the displayed three-dimensional distribution image; and
   a two-dimensional image display processor configured to create a two-dimensional image explicitly showing an area which is occupied by one or more micro areas corresponding to the one or more points selected by the point-selecting operation section, or an area which is likely to be a set of micro areas mainly consisting of the one or more micro areas, and to display the two-dimensional image on the display unit.

4. The imaging mass spectrometer according to claim 1, further comprising a segmentation image display processor configured to display, on a same screen of a display unit, a plurality of segmentation images created based on a plurality of sets of data respectively acquired for a plurality of samples by the measurement section.

5. The imaging mass spectrometer according to claim 1, further comprising a statistical analysis processor configured to perform, for each of a plurality of segmentation images created based on a plurality of sets of data respectively acquired for a plurality of samples by the measurement section, a predetermined statistical analysis concerning information obtained from each of the plurality of segmentation images.

6. A method for imaging mass spectrometry, comprising:
measurement step configured to perform a mass spectrometric analysis for each of a plurality of micro areas which are set within a measurement area on a target sample;
a dimension reduction processing step configured to perform data processing by a non-linear dimension reduction method using manifold learning on mass spectrometric data for each micro area acquired in the measurement step, to obtain, for each micro area, a set of data reduced to three dimensions from dimensions corresponding to a number of mass-to-charge-ratio values;
a display color determination step configured to determine a color for each of a plurality of points corresponding to the data of the micro areas after dimension reduction in the dimension reduction processing step, by arranging those points within a three-dimensional space having three axes representing the three dimensions, with three primary colors respectively assigned to the three axes; and
a segmentation image creation step configured to create a segmentation image corresponding to the measurement area or a partial area in the measurement area, by arranging, on two dimensions, pixels which respectively correspond to the points within the three-dimensional space, where each pixel has a color given to the point corresponding to the pixel and is located according to a position within the measurement area of the micro area corresponding to the point.

7. The method for imaging mass spectrometry according to claim 6, wherein the non-linear dimension reduction method is a method based on uniform manifold approximation and projection for dimension reduction (UMAP).

8. The method for imaging mass spectrometry according to claim 6, further comprising:
a three-dimensional image display step configured to create a three-dimensional distribution image in which the points each having a color determined in the display color determination step are arranged within the three-dimensional space, and to display the three-dimensional distribution image on a display unit;
a point-selecting operation step configured to allow a user to select one or more points on the displayed three-dimensional distribution image; and
a two-dimensional image display step configured to create a two-dimensional image explicitly showing an area which is occupied by one or more micro areas corresponding to the one or more points selected in the point-selecting operation step, or an area which is likely to be a set of micro areas mainly consisting of the one or more micro areas, and to display the two-dimensional image on the display unit.

9. The method for imaging mass spectrometry according to claim 6, further comprising a segmentation image display step configured to display, on a same screen of a display unit, a plurality of segmentation images created based on a plurality of sets of data respectively acquired for a plurality of samples in the measurement step.

10. The method for imaging mass spectrometry according to claim 6, further comprising a statistical analysis processing step configured to perform, for each of a plurality of segmentation images created based on a plurality of sets of data respectively acquired for a plurality of samples in the measurement step, a predetermined statistical analysis concerning information obtained from each of the plurality of segmentation images.

* * * * *